United States Patent
Ruffle et al.

(10) Patent No.: US 7,614,661 B1
(45) Date of Patent: Nov. 10, 2009

(54) WELDING SOCKET

(75) Inventors: Stephen Colin Ruffle, Ipswich (GB); Dirk Petry, Schaffhausen (CH); Bernd Schwarz, Schaffhausen (CH)

(73) Assignees: Petro Technik Limited (GB); Georg Fischer Wavin AG (CH)

( * ) Notice: Subject to any disclaimer, the term of this patent is extended or adjusted under 35 U.S.C. 154(b) by 1288 days.

(21) Appl. No.: 10/111,227

(22) PCT Filed: Sep. 14, 2000

(86) PCT No.: PCT/GB00/03526

§ 371 (c)(1), (2), (4) Date: Sep. 3, 2002

(87) PCT Pub. No.: WO01/20219

PCT Pub. Date: Mar. 22, 2001

(30) Foreign Application Priority Data

Sep. 14, 1999 (GB) ................................. 9921613.7
Oct. 2, 1999 (GB) ................................. 9923265.4

(51) Int. Cl.
*F16L 47/03* (2006.01)
*F16L 47/02* (2006.01)
(52) U.S. Cl. ............... 285/21.1; 285/21.2; 285/294.1; 219/535
(58) Field of Classification Search ............ 285/285.1, 285/294.1, 21.1, 21.2; 219/535; 156/379.6
See application file for complete search history.

(56) References Cited

U.S. PATENT DOCUMENTS

| | | | |
|---|---|---|---|
| 3,062,940 A | | 11/1962 | Bauer |
| 3,482,080 A | * | 12/1969 | Kassen ................ 219/535 |
| 3,610,663 A | * | 10/1971 | Lago ................... 285/4 |
| 3,751,076 A | * | 8/1973 | Thais et al. ............ 285/62 |
| 3,943,334 A | * | 3/1976 | Sturm ................. 219/544 |
| 4,224,505 A | * | 9/1980 | Sturm ................. 219/544 |
| 4,226,444 A | * | 10/1980 | Bunyan ............... 285/21.1 |
| 4,313,053 A | * | 1/1982 | Sturm ................. 219/544 |
| 4,486,650 A | * | 12/1984 | Bridgstock et al. ...... 219/544 |
| 4,530,521 A | | 7/1985 | Nyffeler |

(Continued)

FOREIGN PATENT DOCUMENTS

CH       553369       8/1974

(Continued)

OTHER PUBLICATIONS

U.K. Search Report dated Feb. 26, 2001.

(Continued)

*Primary Examiner*—James M Hewitt
(74) *Attorney, Agent, or Firm*—Galgano & Associates PLLC

(57) ABSTRACT

An electrofusion coupling (93) for joining together two or more sections of pipe, said coupling comprising: (i) a substantially cylindrical coupling body having an outer surface and an inner surface, the inner surface being sized and shaped to form a clearance fit with the outer surface of the pipe regions to be joined; (ii) at least one electrical heating (94) element set on or in the inner surface of the coupling body; (iii) terminal means adapted to connect the electrical heating means to an electrical supply; characterized in that the terminal means does not project beyond the outer cylindrical surface of the coupling body once the welding process is complete.

14 Claims, 11 Drawing Sheets

U.S. PATENT DOCUMENTS

| | | | | |
|---|---|---|---|---|
| 4,852,914 | A | * | 8/1989 | Lyall ..................... 285/21.2 |
| 4,855,574 | A | | 8/1989 | Lodder et al. |
| 5,277,456 | A | * | 1/1994 | Mer et al. ............... 285/21.2 |
| 5,364,130 | A | * | 11/1994 | Thalmann ............... 285/21.2 |
| 5,398,974 | A | * | 3/1995 | Mizukawa et al. ....... 285/21.2 |
| 5,529,656 | A | | 6/1996 | Ewen et al. |
| 5,581,872 | A | * | 12/1996 | Miyadai et al. ............ 29/611 |
| 5,618,065 | A | * | 4/1997 | Akiyama ................. 285/21.2 |
| 5,687,996 | A | * | 11/1997 | Steinmetz et al. ........ 285/21.1 |
| 6,131,954 | A | * | 10/2000 | Campbell ............... 285/21.1 |
| 6,135,508 | A | * | 10/2000 | Genoni et al. ........... 285/21.2 |
| 6,198,081 | B1 | * | 3/2001 | Steinmetz et al. .......... 219/535 |
| 6,394,502 | B1 | * | 5/2002 | Andersson .............. 285/21.2 |
| 6,428,054 | B1 | * | 8/2002 | Zappa et al. ........... 285/123.15 |
| 2003/0218006 | A1 | * | 11/2003 | Sutorius ................. 219/535 |

FOREIGN PATENT DOCUMENTS

| | | |
|---|---|---|
| DE | 3808734 | 10/1989 |
| EP | 0103075 | 3/1984 |
| EP | 0838878 | 4/1998 |
| GB | 1440713 | 3/1974 |
| GB | 2036225 | 4/1979 |
| GB | 2318543 | 4/1998 |
| JP | 4277397 | 2/1992 |
| JP | 5280684 | 10/1993 |
| JP | 6137841 | 5/1994 |
| SU | 1070812 | 7/1991 |
| WO | WO 98 48207 A1 | 10/1998 |

OTHER PUBLICATIONS

International Search Report—PCT/GB00/03526.
European Search Report EPO 838818A1.

* cited by examiner

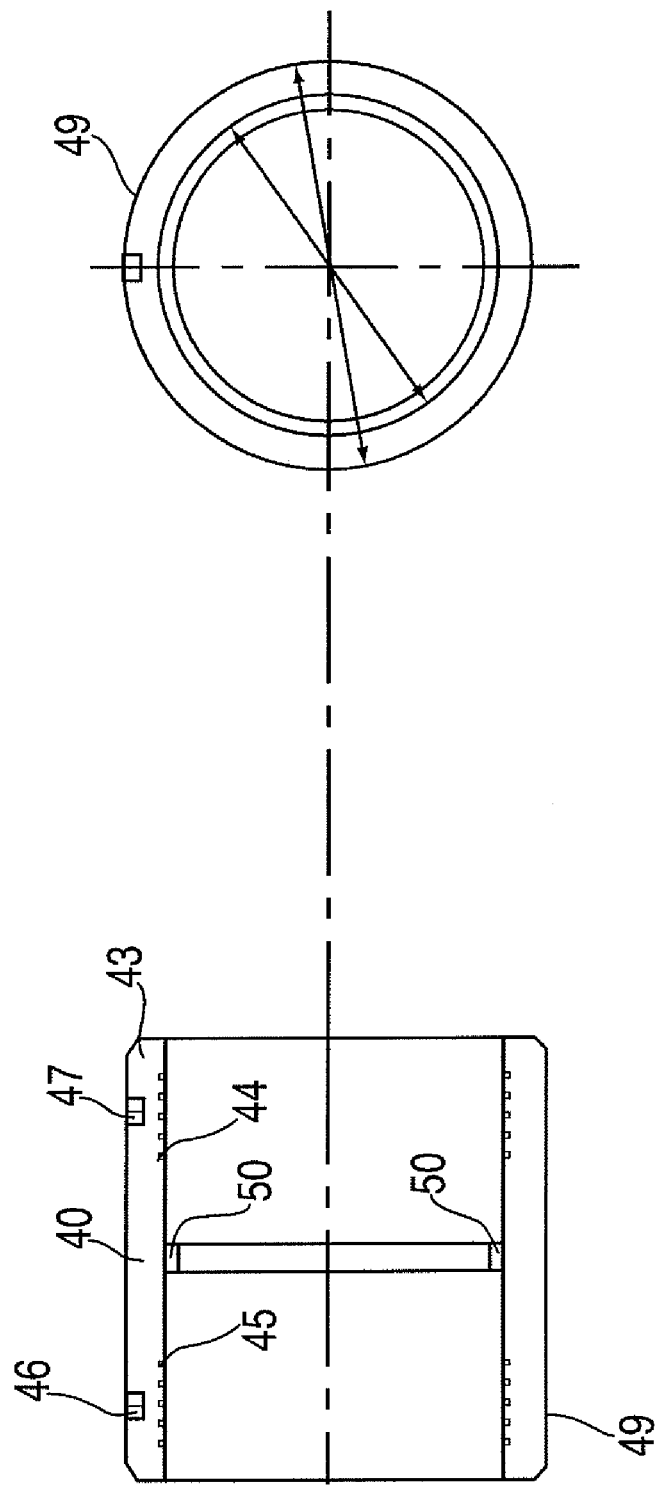

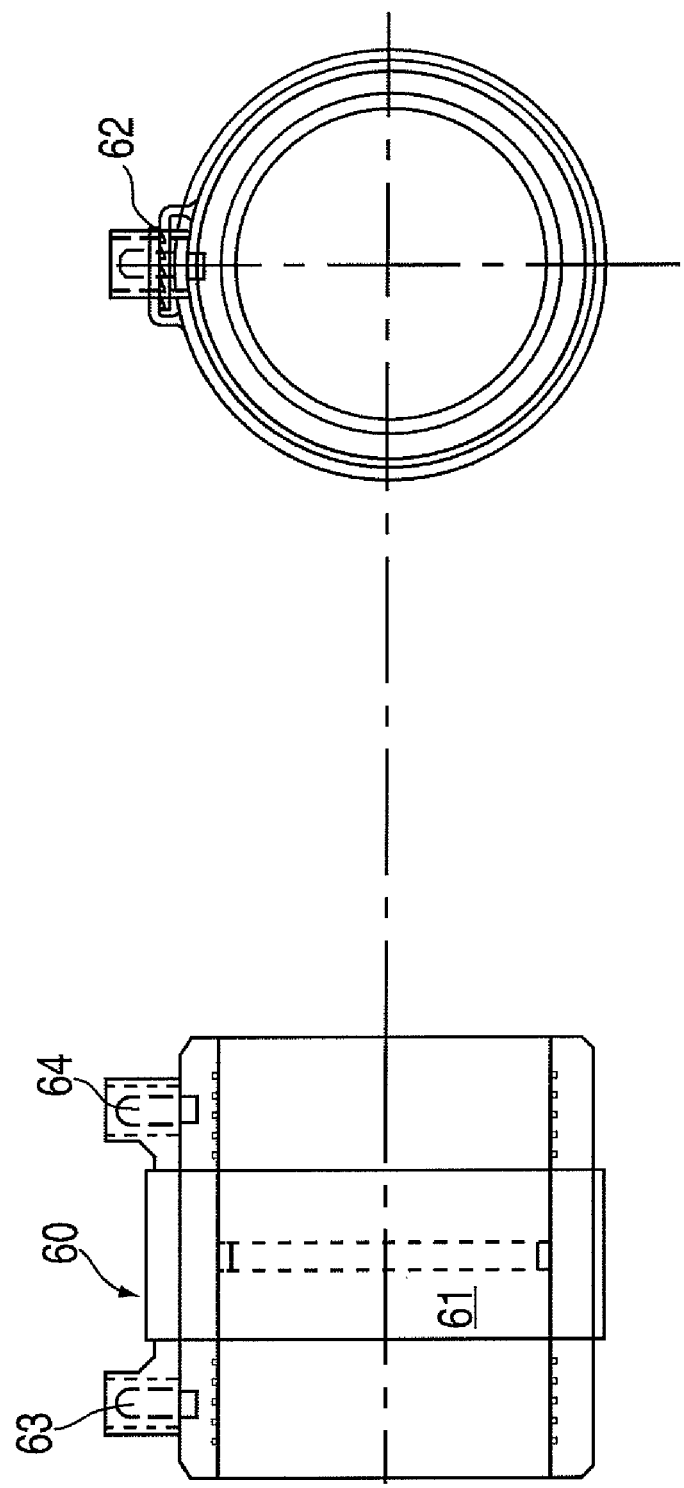

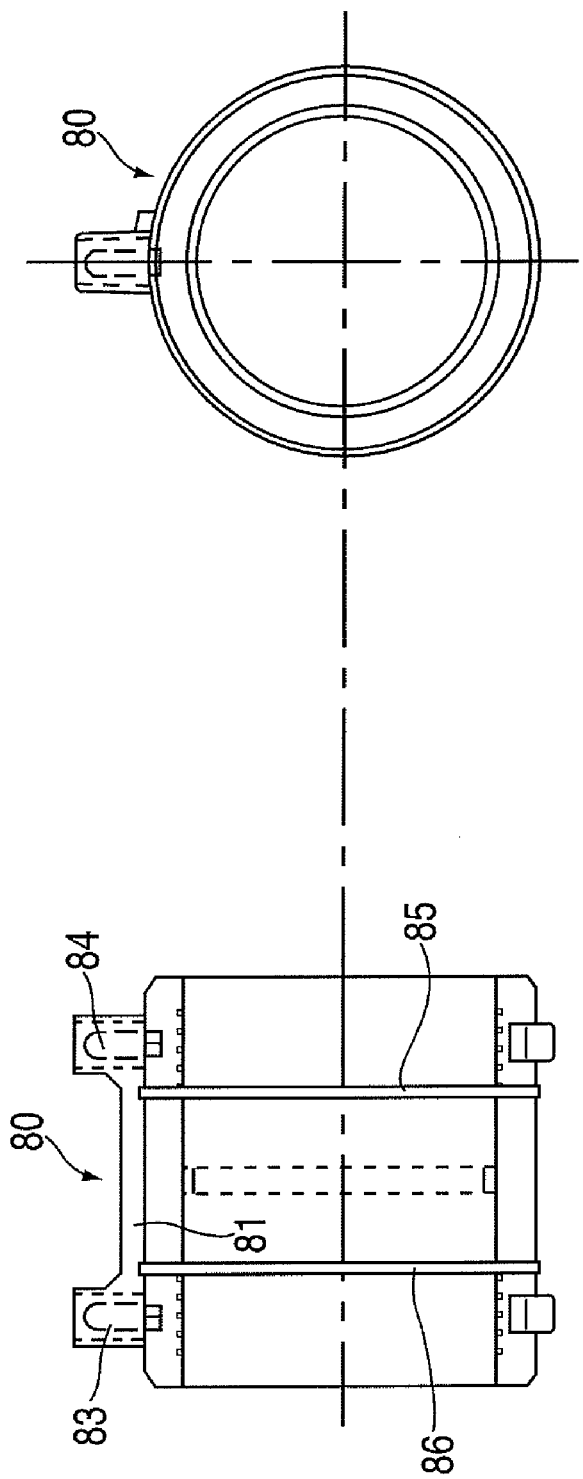

WELDING SOCKET

FIELD OF THE INVENTION

The present invention relates to welding sockets. It is particularly applicable, but in no way limited, to welding sockets for joining secondarily contained pipes for conveying fluids.

BACKGROUND TO THE INVENTION

Pipes made of plastics material are used extensively in industry and in construction. Many applications now use pipes made from plastics materials such as polyethylene and polypropylene rather than metal. One such application is the pipe work used in petroleum installations such as garage forecourts.

In the design of petroleum forecourt installations for example, it is regarded as increasingly important to contain and detect any leaks of petrol or diesel fuel from subterranean pipes which connect one or more storage tanks to dispensing pumps in the installation. To that end, many current designs of forecourt installation utilise secondary containment. This involves containing each supply or primary pipeline in a respective secondary containment pipeline which is optionally sealed at its ends to the fuel supply pipelines. The secondary containment pipeline prevents leaks from the fuel supply pipeline from being discharged into the environment, and also can convey leaked petrol to a remote-sensing device.

Whilst every effort is made to avoid having joints in an underground supply pipeline, other than inside manhole chambers, these joints sometimes cannot be avoided. Such joints are conventionally made using special fittings and the connections are made using a chemical-based jointing compound or by electrofusion welding. The latter technique is preferred in many applications.

In conventional single containment plastic piping systems, successive lengths of plastic pipe are joined end to end using so-called electrofusion couplings, sockets or welding muffs, which typically comprise short plastic sleeves providing sockets at either end having internal diameters of a size to receive the ends of the respective pipes as a close fit and incorporating electrical resistance heating windings. Thus two adjoining pipe lengths can be connected end to end by inserting the adjoining pipe ends into such an electrofusion coupling from opposite ends thereafter passing electric current through the heating windings in order to fuse the internal surfaces of the electrofusion coupling and the adjacent external surfaces of the inserted pipe ends, thereby welding the pipe ends to the electrofusion coupling to form a fluid tight joint.

In the context of this invention the term welding socket will be used to encompass any coupling which can be used to join two or more pieces of pipe end to end using the process described above.

It follows that these electrofusion-welding sockets must have at least two terminals to enable them to be connected to an electrical supply or welding unit as it is termed.

The most common solution is to use terminal pins which protrude proud of the socket body and usually at right angles to the longitudinal axis of the socket and to the pipework which is being welded. These pins are typically small metal pin connectors and need protection during welding for safety reasons. They are therefore usually formed within a shroud moulded from the same material as the welding socket. All in all, the protrusion caused by these terminals is substantial since the terminal pins project outwardly from the welding socket by a distance greater than the thickness of the socket wall. Typically the terminals project outward from the surface of the socket body by an amount equivalent to 2.5 to 4 times the thickness of the socket wall.

This causes a number of problems. Firstly, it prevents a secondary pipe from passing smoothly over the welding socket region of a primary pipe. The secondary pipe tends to snag or foul on the protruding terminals. Secondly, the secondary pipe has to be formed with a larger diameter than would otherwise be necessary. This results in a larger than ideal interstitial space between the primary and secondary pipes. It also increases the cost of the installation because the larger the diameter of the secondary pipe, the more plastics material there is in it and the more it costs.

Matters are further complicated if a joint is being formed in the latest composite primary/secondary pipe. In this type of pipe, an example of which is described in GB9824955.6 and PCT/GB98/03422 (PetroTechnik Ltd), the primary and secondary pipe are formed as one with a relatively thin insulating layer in-between. Conventional welding sockets cannot be used at all to weld this type of pipe because there is insufficient space between primary and secondary pipes to accommodate the inevitable terminal pins on the welding socket used on the primary pipe.

Accordingly, it is an object of the present invention to overcome or at least mitigate one or more of the problems outlined above.

SUMMARY OF THE INVENTION

According to the present invention there is provided an electrofusion coupling for joining together two or more sections of pipe, said coupling comprising:—

(i) a substantially cylindrical coupling body having an outer surface and an inner surface, the inner surface being sized and shaped to form a clearance fit with the outer surface of the pipe regions to be joined;

(ii) at least one electrical heating element set on or in the inner surface of the coupling body;

(iii) terminal means adapted to connect the electrical heating means to an electrical supply;

characterised in that the terminal means does not project beyond the outer cylindrical surface of the coupling body once the welding process is complete.

This arrangement has the advantage that the electrical terminations for the heating element(s) do not extend proud of the cylindrical coupling body once the coupling process has been completed and tested.

Preferably the terminal means comprises a temporary set of terminals, detachably mounted onto the coupling body. Temporary or detachable terminal means are a convenient way of removing the contactors which are inevitably required to make good electrical contact.

Preferably the temporary terminals are slideably mounted with respect to the coupling body.

Alternatively the terminal means comprises a cuff adapted to clip over the coupling.

Where a cuff is used the cuff may take the form of a strap which fastens around the outer surface of the coupling.

A strap has the advantage that it can be fastened tightly and securely around the coupling to ensure good electrical contact.

In a further preferred embodiment the cuff is formed from resilient material and is adapted to clip around a part of the circumference of the coupling.

In an alternative preferred embodiment the terminal mean comprises spring loaded depressible contacts.

This arrangement has the advantage that the terminal means can also act as a locator to position an outer coupling when joining secondary pipes.

Preferably the depressible contacts may be moved from a position in which they will depress to a position in which they will not depress. This second position provides a rigid contact for electrical purposes.

In a particularly preferred embodiment the detachable terminal means are bonded to the coupling in a temporary fashion such that after the welding operation is complete the terminal means can be detached.

This arrangement has the advantage that the fitting appears very much like conventional fittings. This helps to gain acceptance from the artisan installing the system.

Preferably the bond is formed by welding the terminal means to the coupling body at strategic points. Ultrasonic welding is a preferred welding technique.

In an alternative embodiment the terminal means comprises electrical terminals set within the body of the coupling such that the terminals do not project substantially beyond the outer surface of coupling body. The terminals within the terminal means are therefore partly shrouded by the coupling body although not totally surrounded as in known couplings.

BRIEF DESCRIPTION OF THE DRAWINGS

The invention will now be described, by way of example only, with reference to the accompanying drawings wherein:—

FIGS. 2A and 2B show longitudinal and transverse cross-sectional views of a primary pipe welding socket according to a second embodiment of the present invention;

FIGS. 3, 4 and 5 show various arrangements for connecting terminal connectors onto contact points on the welding socket as shown in FIG. 2;

FIGS. 6A to 6G illustrate various views of a third embodiment of the present invention;

DETAILED DESCRIPTION OF THE EMBODIMENTS

The embodiments of the present invention will now be described by way of example only. They are currently the best ways known to the applicant of putting the invention into practice but they are not the only ways in which this can be achieved.

Figures 1A, 1B:
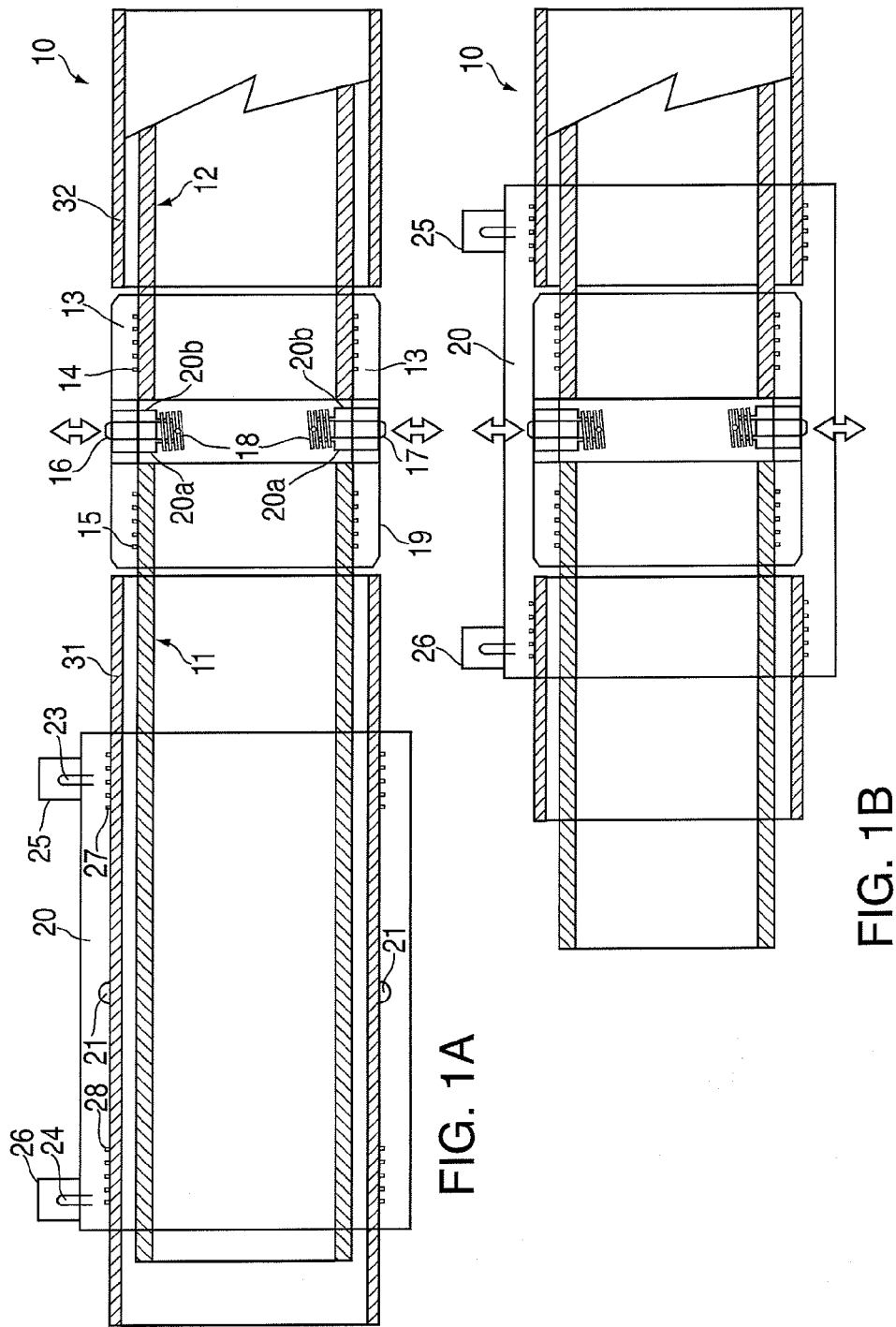
FIGS. 1A and 1B show cross-sectional views of primary and secondary pipes being joined by a welding socket according to a first embodiment of the present invention.
Figure 4C:
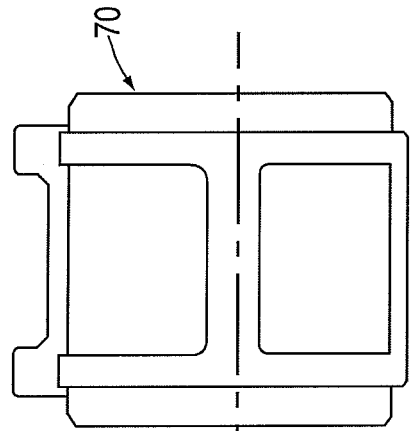
Figure 4B:
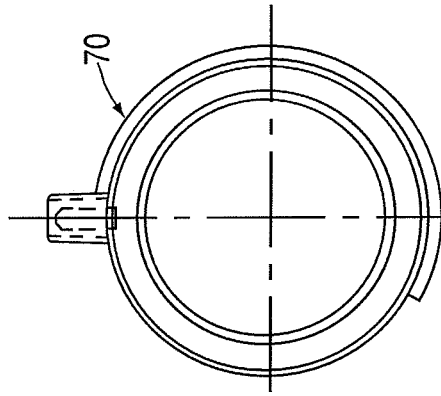
Figure 4E:
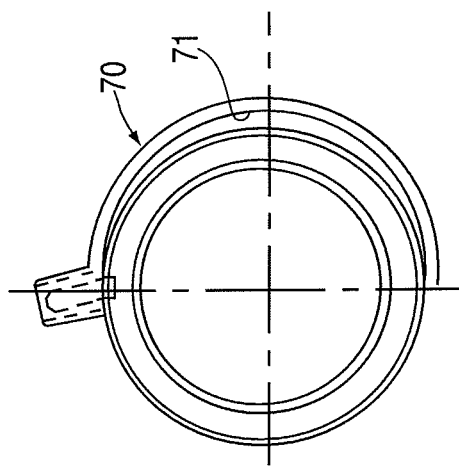
Figure 4A:
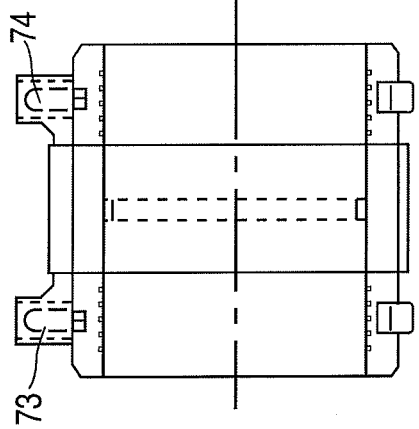
Figure 4D:
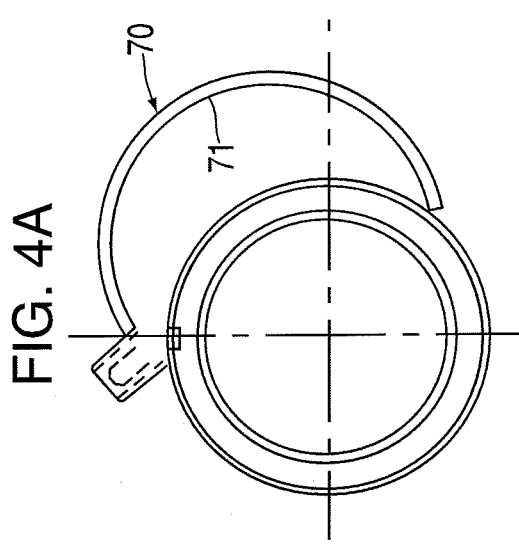
Figure 6A:
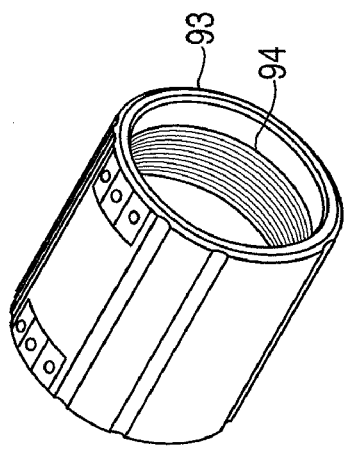
Figure 6B:
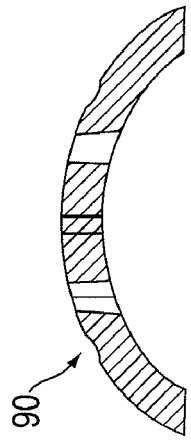
Figure 6C:
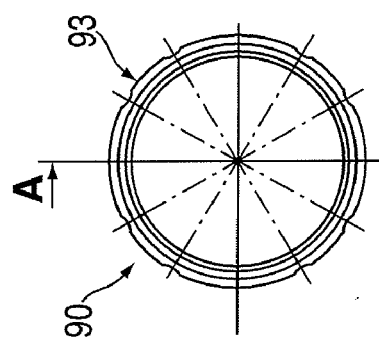
Figure 6D:
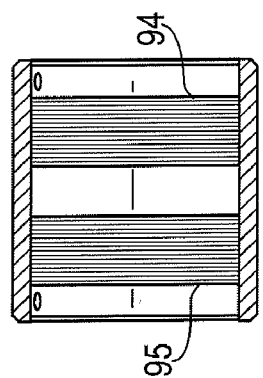
Figure 6E:
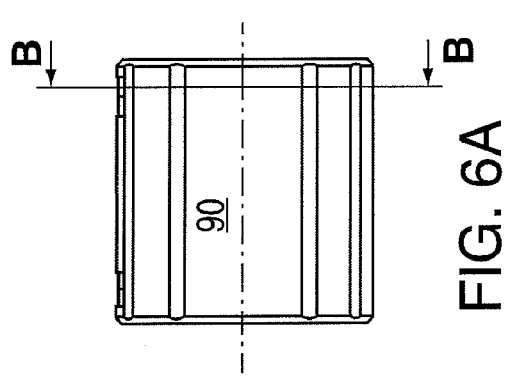
Figure 6F:
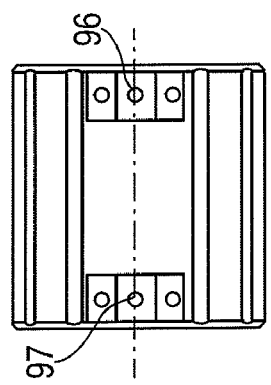

Referring to FIGS. 1A and 1B, these show a welding socket 10, referred to hereafter as an inner welding socket, for joining end to end two lengths of primary pipe 11 and 12. The socket comprises a generally circular tube 13 whose outer surface is substantially circular cylindrical, interrupted only by spring loaded terminal contacts 16 and 17. The inner surface of the welding socket incorporates electrical windings 14, 15 as in a conventional welding socket. Stops 20a and 20b are located on the inner fixing surface at substantially the mid point of the welding socket. These stops allow a portion of primary pipe to be inserted into the welding socket only as far as the stop position. This ensures that the welding socket is located centrally between the two pipe ends to be welded. An electrical current can be applied to the terminals 16, 17 by a special adapter or contact means (see below) and fusion welding takes place in the usual manner.

There are several important features of this inner welding socket. The external diameter of the socket is only very slightly less than the internal diameter of the secondary pipe. Thus, the inner welding socket is a close sliding fit within an outer welding socket 20. This type of clearance fit is necessary for an effective joint.

The spring loaded depressible contacts 16, 17 are a key feature. They can be depressed to enable the outer welding socket to pass over the previously jointed primary pipe but the contacts spring up once they have reached a groove 21 in the inner wall of the outer welding socket. This ensures that the outer welding socket locates centrally over the inner welding socket, which would otherwise be totally obscured from view. The joint between the two ends of adjacent secondary pipe is formed in a conventional manner using terminals 23 and 24 formed within conventional plastic shrouds 25 and 26.

In a variation to this first embodiment the depressible contacts may be designed such that in a particular configuration the contacts will not depress. This enables a connection to be made directly to a welding unit. For example, turning the contacts to a particular orientation may cause them to engage with a stop designed to prevent downward movement. Once the weld has been formed and tested the contacts may be rotated to an orientation whereby they can pass by the stop and they can then be depressed into the body of the welding socket to allow a second welding socket to pass over the first.

A second type of primary pipe or inner welding socket is shown in FIG. 2. In this case the contacts 46 and 47 are formed in depressions within the welding socket wall 43. It follows that there are no protrusions whatsoever in this version and the outer wall 49 of the welding socket is a substantially uninterrupted circular cylinder along its entire length. Electrical contact is made using one of the devices described below.

In both the welding sockets described above there is no fixed terminal pin which projects beyond the outer surface of the welding socket. In order to make an electrical contact with the welding unit a further component or contact means is required. Various types of contact means are illustrated in FIGS. 3, 4 and 5.

In FIG. 3 there is illustrated a flexible cuff 60 which is adapted to encircle the welding socket. The cuff is formed from a generally circular flexible strap 61, split across its width such that it can be prized-open and slipped over the welding socket once the welding socket is properly in place. The strap is fastened firmly around the welding socket by a fixing means, in this example by counter-engaging teeth 62. The region of the fixing means is, of necessity, rather more rigid than the remainder of the strap. Also included in the fixing region are two electrical terminals which provide shrouded terminal pins 63, 64. These pins mimic the terminal pins on a conventional welding socket although, importantly, they project through the body of the cuff to the inner surface of the cuff in order to engage with the contact regions in the welding socket itself.

Thus a two part-welding socket is envisaged. This comprises a first component adapted to fit over the adjacent ends of two pipe sections. This first component incorporates electrical windings and electrical contacts but no terminal pins. A second component fits onto, over or partially around the first component and incorporates the terminal pins or terminal means necessary to make good electrical contact with a welding unit. Further examples of different types of contact means being the second component are illustrated in FIGS. 4 and 5.

FIG. 4 illustrates a semi-ridged clip-on cuff 70 whose inner surface 71 corresponds to the external profile of the welding socket. In this case, the cuff is not intended to fully encircle the welding socket but merely clip around a little over half its circumference. The natural resilience of the cuff material helps to keep it in place. Once again, terminals 73, 74 are provided which form electrical contact with the contacts in the welding socket itself and provide terminal pins as described above.

The cuffs illustrated in FIGS. 3 and 4 are designed to be reusable. Once a satisfactory joint has been formed and pressure tested, the cuff is removed and can be used again on subsequent joints.

FIG. 5 illustrates a further method of attaching a contact means around a welding socket. In this case, a terminal block 81 containing the necessary terminal pins and electrical contacts is held in place around the welding socket by two straps 85 and 86. The welding socket is supplied in this configuration with the contact means secured in place. Once the joint has been completed and pressure tested then straps 85 and 86 are cut and the terminal block removed. This type of contact means is generally not reusable. The straps can be formed from any suitable material such as plastic or metal wire.

In a further variation (not shown) electrical contact is made by way of spade terminals which engage with corresponding terminals in the outer surface of the socket. These terminals may be curved to follow the profile of the surface of the welding socket.

Figure 7C:
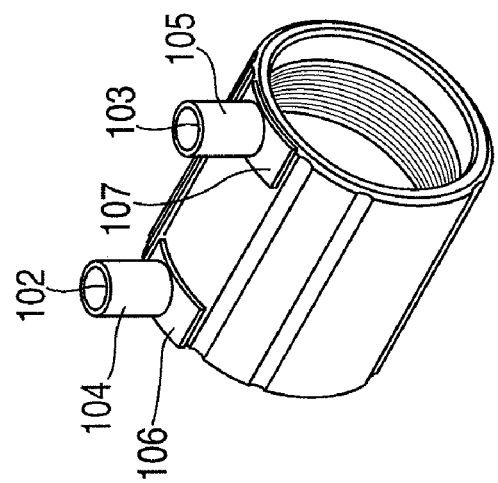
FIGS. 7A to 7C illustrate various views of the welding socket of FIG. 6 with a terminal pin assembly in position.
Figure 7B:
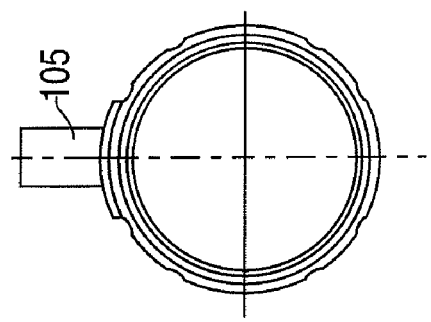
Figure 7A:
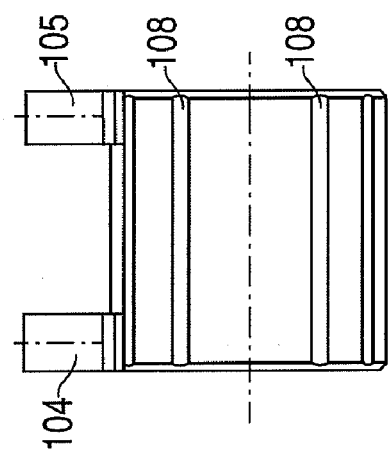
Figure 8C:
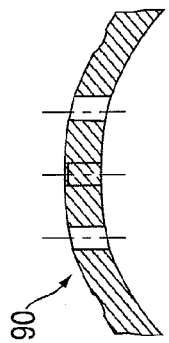
FIGS. 8A to 8F illustrate various views of a further version of the third embodiment.
Figure 8F:
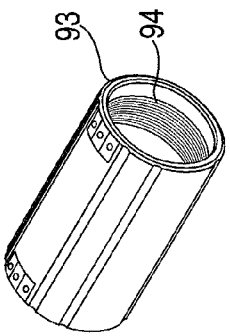
Figure 8B:
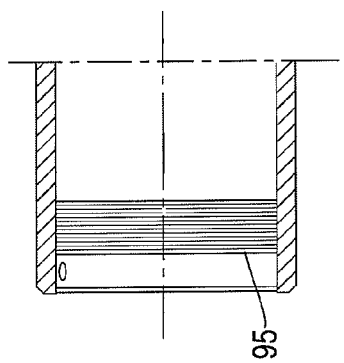
Figure 8E:
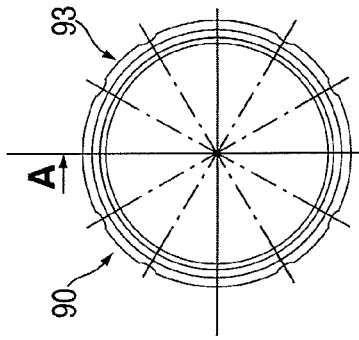
Figure 8A:
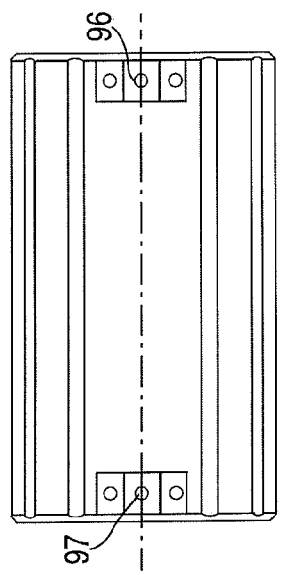
Figure 8D:
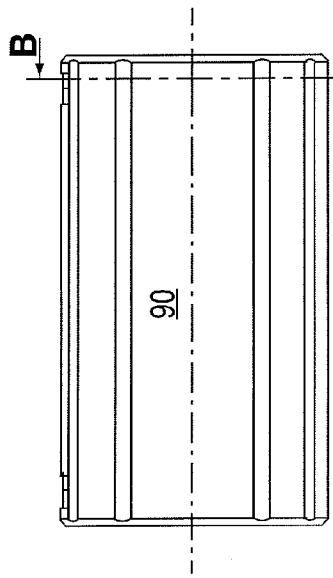
Figure 9C:
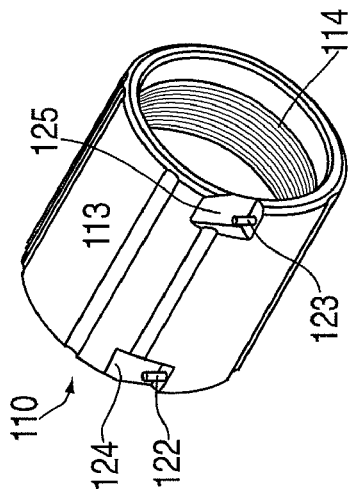
FIGS. 9A to 9E illustrate various views of a fourth embodiment of the present invention.
Figure 9B:
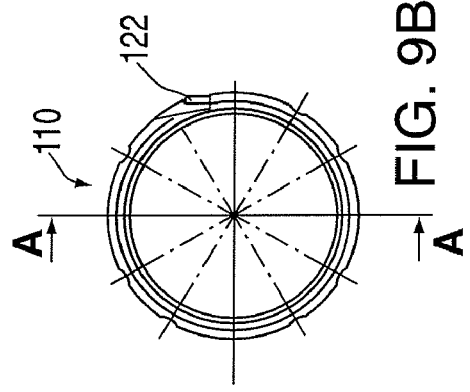
Figure 9E:
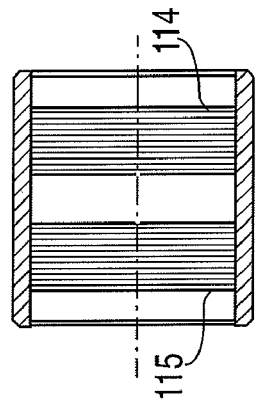
Figure 9A:
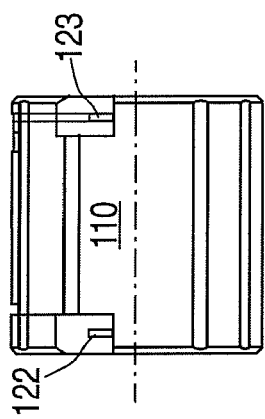
Figure 9D:
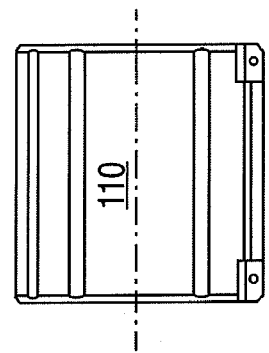
Figure 10A:
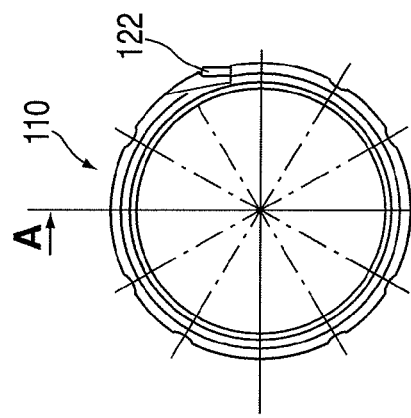
FIGS. 10A to 10D illustrate various views of a further version of the fourth embodiment.
Figure 10B:
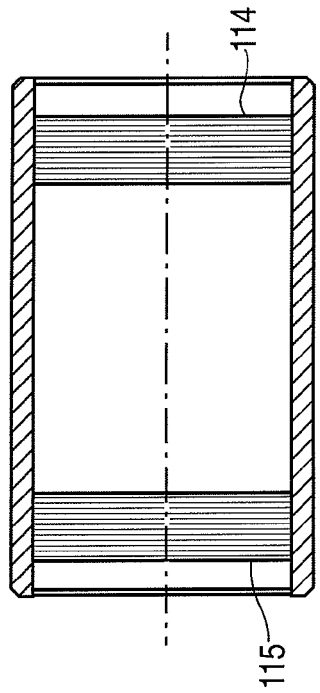
Figure 10C:
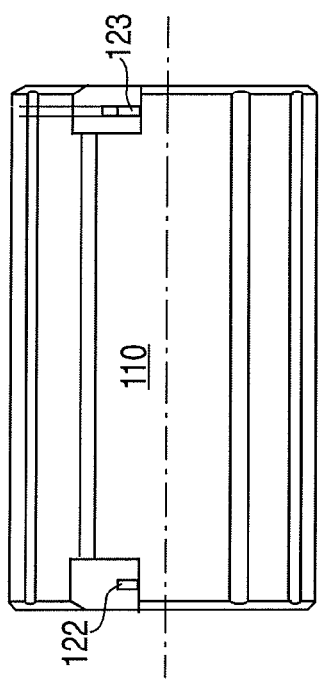
Figure 10D:
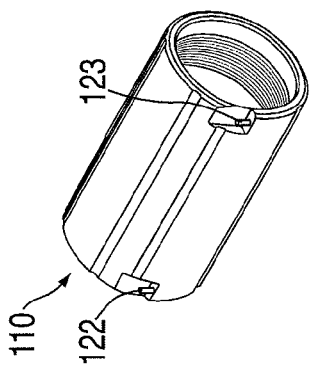

A third embodiment of the present invention is illustrated in FIGS. 6, 7, and 8. In this case a welding socket 90 comprising a tubular element 93 is formed from plastics material and contains at or near the inner surface two sets of electrical windings 94 and 95. The terminals or contact points 96, 97 at the end of these windings are set within the body of the tube and are preferably flush with the tube surface at that point. These contact points are so arranged that terminal pin assemblies can be fastened over the contacts in a temporary fashion. The fully assembled welding socket is illustrated in FIG. 7. If desired, the two sets of windings can be connected across the welding socket such that only two terminal pins are required, one on each side of the socket.

The terminal pin assemblies comprise terminal pins 102, 103 protected in the normal way by plastic shrouds 104, 105. Each assembly also has a base 106, 107 which substantially follows the contours of the outer surface of the tube. The base acts as fixing point and a variety of fixing methods are envisaged. Thus, the terminal pin assemblies could be screwed or glued in place or be a sliding fit with the end of the welding socket tube. In a preferred embodiment the two components are ultrasonically welded together at strategic points using a spot welding technique. These welds are strong enough to keep the two components together and the terminal pins in electrical connection with the winding contacts prior to welding but weak enough such that the terminal pin assemblies or terminal means can be removed after the weld is complete and tested. The preferred method of fixing will be determined by the materials specialist and will depend, in part, on the materials used and the application. The inventive feature is considered to be the separate and removable terminal pin assemblies. In practice, where ultrasonic welding is used, the terminal pin assemblies can be knocked off with a hammer blow or prised off with a screwdriver. A shaped entry point (not shown) can be provided to allow a screwdriver blade to be inserted between the temporary terminal means and the body of the coupling. Leverage on the screwdriver causes the two components to separate. The result is a finished coupling with no significant protrusions extending proud of the outer cylindrical surface of the coupling. Once again, it will be appreciated that at the end of the welding operation described above there are no protrusions which stand proud of the generally tubular surface of the welding socket.

The grooves 108 are a deliberate feature and provide passages for both gas/vapour and liquid to pass over the welding socket even when it is assembled within a fight-fitting secondary pipe. This not only aids assembly but also ensures that there is a free passage for any fuel that might leak out into the interstitial space between primary and secondary pipes.

A larger version of the above socket suitable for use with secondary pipes is shown in FIG. 8.

Figure 11:
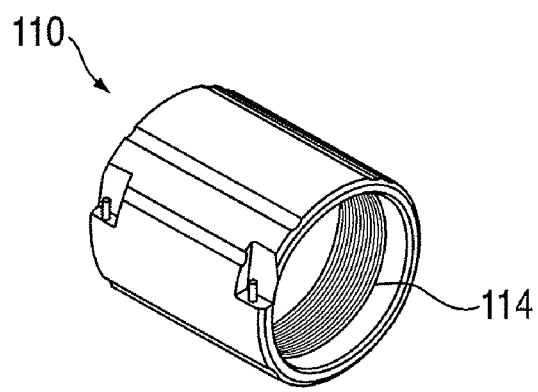
FIG. 11 shows a perspective view of the embodiment shown in FIG. 9.
Figure 12:
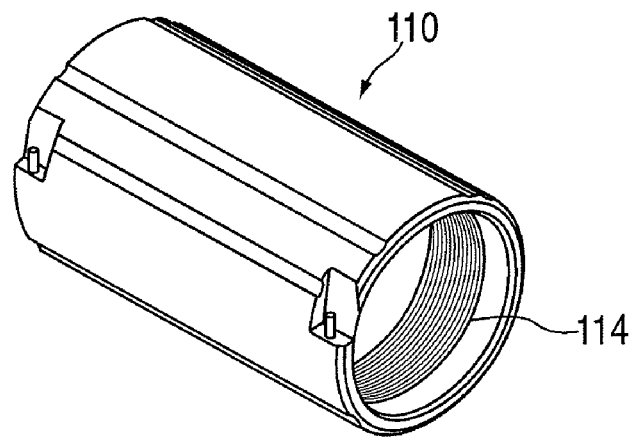
FIG. 12 shows a perspective view of the embodiment shown in FIG. 10.

A fourth embodiment is illustrated in FIGS. 9, 10 and 11. In these versions the terminal pins are not removable but are instead set into the body of the tubular fitting. It has unexpectedly been discovered that the extreme ends of the fitting, which do not contain electrical heating windings, can be used for this purpose. Thus FIG. 9 illustrates a welding socket 110 which consists of a circular tube of plastics material 113 containing electrical windings 114, 115. In all these examples the two concentrations of windings, one at each end of the fitting, are connected across the centre of the fitting such that one continuous wire heats both ends of the socket.

Conventional shaped terminals 122, 123 are set into the body of the socket in stepped indentations 124, 125. These serve to give the pins sufficient protection during storage and use and the usual shrouds are not required.

Whilst this arrangement weakens the outer edge of the socket somewhat, this is not detrimental because these areas are outside the jointed region.

FIG. 10 shows various views of a longer fitting of the general type shown in FIG. 9 and which is suitable for joining secondary pipes over a primary pipe coupling.

Whilst not shown, these versions can incorporate a central stop in order to centralise pipes within a fitting. However, in the case of primary/secondary pipes of unitary construction these stops are not necessary. The shape of the termination at the end of each piece of pipe ensures that the two pipes meet centrally and butt against each other within the fitting. This is an important improvement because it ensures that the pipe liner, usually of nylon, runs substantially the whole length of the pipe without interruption.

In summary, the inventive concept of the present invention involves the use of a slim-line welding socket which contains the electrofusion wires but no terminal pins or shrouds which stand proud of the outer tubular surface of the fitting after the coupling joint has been formed. This enables the minimum size of secondary containment pipework to be used and the secondary pipe-welding socket may be slid over the slim-line primary socket without obstruction. Various alternative ways of providing the necessary terminal pins are described. One alternative is to contain the terminal pins within the welding socket but to allow them to move backwards and forwards in a radial direction by means of a spring so that the secondary socket may pass over the primary welding socket and locate around these pins. Alternative versions are to provide a temporary, removable terminal pin assembly or terminal means, or to set the terminal pins into the body of the socket in a region where a reduction in wall thickness is not detrimental.

The primary system may be welded, then pressure tests may be carried out to ensure there are no leaks present. The secondary welding socket can then be placed over the primary welding socket as a sliding fit due to the lack of terminal pins and connectors which project out from the body of the coupling. The secondary pipes may then be welded producing a simple, compact and complete secondarily contained system. This technology is suitable for use with all plastic pipework applications.

Various terminal pin assemblies have been developed which locate onto a conductive area or areas on the outer body of a slim-line welding socket. This assembly may take the form of a tool for multiple re-use with a number of welding sockets or may be a disposable unit used only once.

The invention claimed is:

1. An electrofusion coupling for joining together at least two sections of pipe, said coupling comprising:
    (i) a substantially cylindrical coupling body having an outer surface and an inner surface, the inner surface being sized and shaped to form a clearance fit with the outer surface of the pipe sections to be joined;
    (ii) at least one electrical heating element disposed adjacent to the inner surface of the coupling body; and
    (iii) terminal means adapted to connect the electrical heating element to an electrical supply;
    wherein the terminal means comprises at least one electrical contact point disposed adjacent to the outer cylindrical surface of the coupling body, and at least one temporary terminal, wherein the temporary terminal is bonded to the coupling body over said electrical point in a temporary fashion, such that, at the end of the welding operation, the temporary terminal may be separated from the coupling body to result in a finished coupling with no significant protrusions extending substantially beyond the outer cylindrical surface of the coupling, so as to permit the coupling to form a clearance fit within a secondary coupling.

2. An electrofusion coupling as claimed in claim 1 wherein the electrical contact point is flush with the outer cylindrical surface of the coupling body.

3. An electrofusion coupling as claimed in claim 1 wherein the contact point is formed in a depression within the outer cylindrical surface of the coupling body.

4. An electrofusion coupling as claimed in claim 1 wherein the bond between the temporary terminal and the coupling body is formed by welding the temporary terminal to the coupling body at strategic points.

5. An electrofusion coupling as claimed in claim 1 wherein the terminal means further comprises a shaped entry point to allow a screwdriver blade to be inserted between a temporary terminal and the coupling body such that leverage on the screwdriver causes the two components to separate.

6. An electrusion coupling as claimed in claim 1 wherein the temporary terminal is slidably mounted with respect to the coupling body.

7. An electrofusion coupling as claimed in claim 1 wherein the outer surface of the coupling body incorporates at least one groove to provide at least one passage for vapor and liquid to pass over the coupling when the coupling is assembled within a secondary pipe.

8. An electrofusion coupling as claimed in claim 1 wherein the bond between the temporary terminal and the coupling body is formed by gluing the temporary terminal to the coupling body.

9. An electrofusion coupling as claimed in claim 1 wherein said heating element is set in the inner surface of said coupling body.

10. An electrofusion coupling as claimed in claim 1 wherein said heating element is set on the inner surface of said coupling body.

11. An electrofusion coupling as claimed in claim 1 wherein said electrical contact point is set within said outer cylindrical surface of the coupling body.

12. An electrofusion coupling as claimed in claim 1 wherein said electrical contact point is set on said outer cylindrical surface of the coupling body.

13. An electrofusion coupling for joining together at least two sections of pipe, said coupling comprising:
    (i) a substantially cylindrical coupling body having an outer surface and an inner surface, the inner surface being sized and shaped to form a clearance fit with the outer surface of the pipe sections to be joined;
    (ii) at least one electrical heating element disposed adjacent to the inner surface of the coupling body; and
    (iii) terminal means adapted to connect the electrical heating element to an electrical supply;
    wherein the terminal means comprises at least one electrical contact point disposed adjacent to the outer cylindrical surface of the coupling body, and at least one temporary terminal, wherein the temporary terminal is bonded to the coupling body in a temporary fashion, such that, at the end of the welding operation, the temporary terminal may be separated from the coupling body to result in a finished coupling with no significant protrusions extending substantially beyond the outer cylindrical surface of the coupling and wherein the temporary terminal is slidably mounted with respect to the coupling body.

14. An electrofusion coupling for joining together at least two sections of pipe, said coupling comprising:
    (i) a substantially cylindrical coupling body having an outer surface and an inner surface, the inner surface being sized and shaped to form a clearance fit with the outer surface of the pipe sections to be joined;
    (ii) at least one electrical heating element disposed adjacent to the inner surface of the coupling body; and
    (iii) terminal means adapted to connect the electrical heating element to an electrical supply;
    wherein the terminal means comprises at least one electrical contact point disposed adjacent to the outer cylindrical surface of the coupling body, and at least one temporary terminal, wherein the temporary terminal is bonded to the coupling body in a temporary fashion, such that, at the end of the welding operation, the temporary terminal may be separated from the coupling body to result in a finished coupling with no significant protrusions extending substantially beyond the outer cylindrical surface of the coupling and wherein the outer surface of the coupling body incorporates at least one groove to provide at least one passage for vapor and liquid to pass over the coupling when it is assembled within a tight-fitting secondary pipe.

* * * * *